July 10, 1923.
W. SCHMID
LEVEL WIND FISH REEL
Filed July 31, 1922
1,461,586
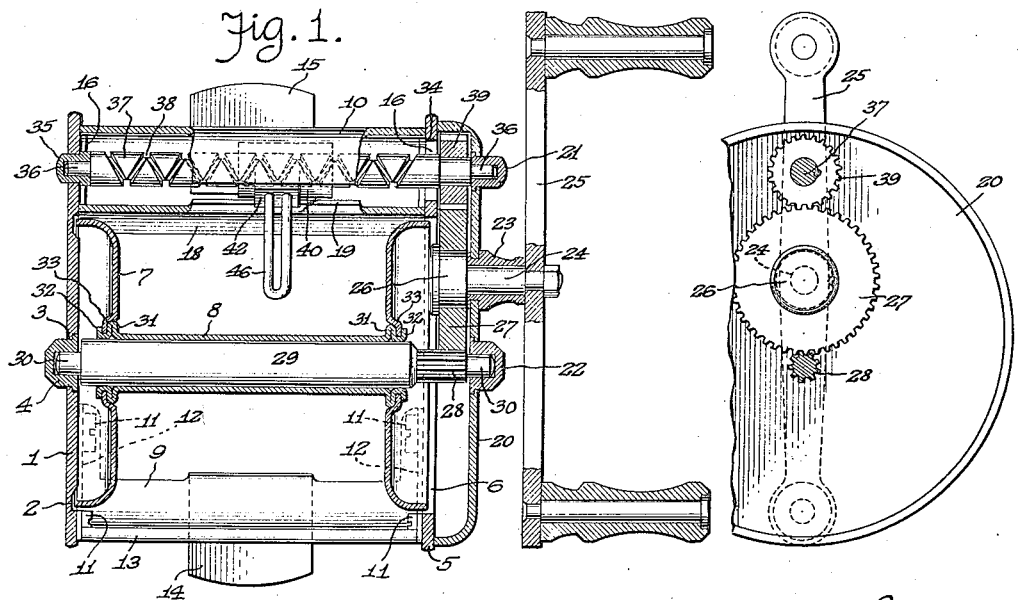

Patented July 10, 1923.

1,461,586

UNITED STATES PATENT OFFICE.

WILLIAM SCHMID, OF COLDWATER, MICHIGAN.

LEVEL-WIND FISH REEL.

Application filed July 31, 1922. Serial No. 578,559.

*To all whom it may concern:*

Be it known that I, WILLIAM SCHMID, a citizen of the United States of America, residing at Coldwater, in the county of Branch and State of Michigan, have invented certain new and useful Improvements in Level-Wind Fish Reels, of which the following is a specification, reference being had therein to the accompanying drawings.

This invention relates to a level wind fish reel and has special reference to certain structural improvements which permit of a good grade of reel being manufactured cheaply; the parts of the reel readily assembled; easy access had to the level wind device of the reel, and a line protected from entanglement and injury.

First, the reel includes a two-part frame construction affording an open light-weight reel, and one of the parts of the reel frame serves as a combined guide and guard in connection with the level wind devices of the reel.

Second, a part of the reel frame provides an inclosure for the level wind screw of the reel, and this screw is assembled relative to its inclosure and heads or end plates of the reel so that it can be removed without disturbing the heads or end plates of the reel.

Third, the spool per se is of novel construction consisting of three parts that may be easily and quickly assembled to afford a rigid spool structure.

The above are a few of the features of my reel and others will appear as the construction is described by aid of the accompanying drawing, wherein—

Figure 1 is a longitudinal sectional view of the level wind fish reel;

Fig. 2 is a cross sectional view of the same;

Fig. 3 is a view of the inner face of a gear housing, partly broken away, and

Figs. 4 and 5 are perspective views of reel frame parts.

In the drawing, the reference numeral 1 denotes a wheel head having its face provided with an annular groove 2 which is eccentrically disposed relative to the periphery of said head and in said head is an opening 3 axially of the groove 2, said opening being fitted with a bearing 4.

5 denotes another reel head provided with an eccentrically disposed opening 6 approximately the diameter of the annular groove 2 of the head 1, said groove and opening providing clearance for the end members 7 of a spool 8.

9 and 10 denote reel frame parts, preferably made of sheet metal and the frame part 9 has end flanges 12 connected by screws 11, or other fastening means to the heads 1 and 5. One of the longitudinal edges of the frame part 9 is inturned, as at 13, to afford a rolled or smooth edge, and the opposite edge of the frame part is cut away and stamped to provide a tangentially disposed seat engaging tongue 14 adapted to cooperate with a complemental tongue 15 of the frame part 10 in holding the reel relative to a fishing rod or other support (not shown). The frame part 10 has end flanges 16 connected to the heads 1 and 5 by screws 17 or other fastening means and this frame part has an edge thereof rolled and inturned to form a shield or guard 18 which also affords an inclosure for a level wind device to be hereinafter referred to. The guard or shield 18 has a longitudinal guide slot 19, and the frame parts are disposed to rigidly connect the heads 1 and 5, just as though a multiplicity of pillars were used, yet providing a wide open reel between the heads 1 and 5.

20 denotes a gear housing suitably secured to the head 5 and mounted in said gear housing are pintle bearings 21 and 22 and a spindle bearing 23. Journaled in the spindle bearing 23 is a spindle 24 having its outer end provided with a double crank 25 and its inner end provided with a head 26 extending into the opening 6 of the head 5. On the head 26 is mounted a large gear wheel 27 meshing with a small gear wheel 28 or toothed portion of a spool shaft 29, said shaft having pintles 30 journaled in the bearings 4 and 22. It is on this spool shaft that the spool 8 is shrunk or otherwise mounted and said spool is made of sheet metal so that its ends may be upset or outturned to provide annular flanges 31 and 32. Prior to forming the flanges 32 the end members 7 are mounted on the ends of the spool and then the ends of the spool are reamed or outturned to form the flanges 32 against annular offset portions 33 of the end members, said offset portions seating on the flanges 31 and providing an unobstructed inner wall for each end member. The end members 7 are of the usual dished or convexo-concave configuration with the peripheral edges thereof extending into the groove 2 of the head 1 and the opening 6 of the head 5. I attach considerable importance to the construction of the spool as the manner of assembling the end members relative to the spool affords a cheap and rigid construction. It is obvious that spot welding or brazing may be resorted to if necessary for positively attaching the end members 7 to the spool 8.

34 denotes an opening in the head 5 longitudinally alining with the pintle bearing 21 of the housing 20 and a pintle bearing 35 of the head 1. Journaled in the pintle bearings 21 and 35 are the pintles 36 of a screw shaft 37 having a diamond thread 38, said screw shaft extending longitudinally of the inclosure formed by the frame part 10 and the guard 18. On the screw shaft 37, within the gear housing 20 is a gear wheel 39 meshing with the gear wheel 27, the gear ratio being such that the screw shaft 37 can be rotated with less speed than the spool shaft 29.

40 denotes a traversing or slidable tubular guide head on the screw shaft 37 and this guide head has sockets 41 and 42, the latter extending into the guide slot 19 of the frame part 10. In the socket 41 is the rotatable positioning pin 43 of a follower 44 which engages in the diamond thread 38 of the screw shaft 37, said follower being placed in the guide head 40 through a slot 45 of said guide head prior to placing the guide head on the screw shaft.

46 is a looped or slotted line guide mounted in the socket 42 of the guide head 40 and the outer end of the line guide is in proximity to a transverse pillar or rod 47 connecting the heads 1 and 5.

A line attached to and wound on the spool 8, in the usual manner, extends through the line guide 46, between said guard and the pillar or rod 47, and when winding the line on a spool the guide 46 is shifted back and forth, longitudinally of the spool, and causes the line to be evenly wound on the spool, so that when casting the chances of a back lash are reduced to a minimum. By reference to Fig. 2 it will be noted that the guard 18 and the guide 46 conformed in curvature to the periphery of the spool and it is practically impossible for a line to become entangled and probably injured by the level wind mechanism, since such mechanism is inclosed by the guard 18 of the frame part 10, in contradistinction to such mechanism being enclosed by a sleeve or barrel carried by the heads 1 and 5 of the reel.

I attach considerable importance to the fact that the reel part 10 serves as a carriage or guide head guide, a line guard, and permits of the screw shaft being removed, with the gear housing, without disturbing the reel heads 1 and 5. The traversing guide or carriage 40 may or may not enter the opening 34 in the head 5, anyway it permits me to make the line guide or carriage of such a length that it will have an additional and substantial bearing on the screw shaft. Furthermore, by extending the socket 42 of the guide head or carriage 40 completely through the guide slot 19 of the guard or shield 18, a line is kept away from the slot in the guard, and consequently a line cannot be worn or cut by contact with edges of the guide slot. All these features are a distinct advantage in reel construction, in the use of the reel, and it will be noted that these results are all attained with a minimum number of reel parts.

One embodiment of my invention has been illustrated, but it is to be understood that the structural elements are susceptible to such variations and modifications as fall within the scope of the appended claims.

What I claim is:—

1. In a fish reel structure in which a spool revolves, reel heads, frame parts connecting said reel heads and cooperating therewith in forming said structure, one of said frame parts forming a guard, and a level wind mechanism in the guard of the frame part adapted to level wind a line on the spool.

2. A fish reel structure as called for in claim 1, wherein said frame part has a wall of its guard slotted to serve as a guide for a portion of the level wind mechanism.

3. A fish reel comprising heads, frame parts connecting said heads, a spool between said heads, a level wind mechanism inclosed by one of said frame parts, and means adapted for simultaneously operating said spool and level wind mechanism.

4. A fish reel as called for in claim 3, wherein said level wind mechanism includes a screw shaft removable through one of said heads.

5. In a fish reel, a line holding spool, a line level wind mechanism, and means to facilitate supporting said spool relative to a rod, said means including a part which cooperates with said reel in providing a guard for said line level wind mechanism.

6. A fish reel as called for in claim 5, and frame parts connecting said reel heads with one of said frame parts serving as a guide, a guard, and an inclosure for said screw shaft.

7. In a fish reel wherein a line is adapted to be wound on a spool driven between reel heads:—a level wind mechanism for such reel, and means to facilitate mounting said reel on a rod, said means including a part which affords a guard for said level wind mechanism.

8. In a fish reel wherein a line is adapted to be wound on a spool driven between reel heads:—a level mechanism for such reel, said mechanism comprising a screw shaft removable through one of said heads, a frame part connecting said heads and inclosing said screw shaft and affording means of mounting the reel on a rod, a guide head slidable on said screw shaft and adapted to traverse said shaft when said shaft is rotated, a line guide extending from said guide head through said frame part, and operating means for said spool and screw shaft.

9. A fish reel as called for in claim 8, wherein said line guide and a wall of said frame part are curved to conform to the periphery of said spool.

10. In a fish reel structure in which a spool revolves, reel heads, one of said heads having an opening, frame parts connecting said reel heads and cooperating therewith in forming said structure, and a level wind mechanism including a drive screw shaft and a line guide carriage, which carriage may enter the reel head opening and thus afford a long bearing on said drive screw shaft.

11. In a fish reel wherein a line is adapted to be wound on a spool driven between reel heads; a level wind mechanism for said reel, said level wind mechanism including a screw shaft operable in synchronism with the spool and removable through one of said heads, and a line guide carriage adapted to traverse said screw shaft and enter one of said heads and thus obtain a long bearing on said screw shaft.

12. In a fish reel structure in which a spool revolves, reel heads, frame parts connecting said reel heads with one of said frame parts forming a slotted inclosure, and a level wind mechanism in the inclosure of the frame part and protruding through the slot of the inclosure and adapted to prevent a line from contacting with edges of the slot of the inclosure.

13. In a fish reel wherein a line is adapted to be wound on a spool driven between reel heads;—a level wind mechanism for said reel, a slotted inclosure for the level wind mechanism, said level wind mechanism including a line guide extending through the slot of said inclosure and adapted to prevent a line from contacting with the edges of the inclosure slot.

In testimony whereof I affix my signature in presence of two witnesses.

WILLIAM SCHMID.

Witnesses:
H. R. SAUNDERS,
J. R. THOMPSON.